United States Patent
Ahmed et al.

(10) Patent No.: US 7,540,028 B2
(45) Date of Patent: May 26, 2009

(54) DYNAMIC NETWORK SECURITY APPARATUS AND METHODS OR NETWORK PROCESSORS

(75) Inventors: Suhail Ahmed, Beaverton, OR (US); Erik J. Johnson, Portland, OR (US); Manasi Deval, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 10/280,250

(22) Filed: Oct. 25, 2002

(65) Prior Publication Data

US 2004/0083385 A1    Apr. 29, 2004

(51) Int. Cl.
*H04L 9/32* (2006.01)
*G06F 12/14* (2006.01)
(52) U.S. Cl. .............................. 726/23; 726/22; 726/24; 726/25
(58) Field of Classification Search ............... 726/22–25

See application file for complete search history.

(56) References Cited

U.S. PATENT DOCUMENTS

| | | | |
|---|---|---|---|
| 6,215,772 B1 | 4/2001 | Verma | |
| 6,321,338 B1 * | 11/2001 | Porras et al. | 726/25 |
| 6,523,173 B1 | 2/2003 | Bergner et al. | |
| 6,904,017 B1 | 6/2005 | Meempat et al. | |
| 7,002,974 B1 * | 2/2006 | Deerman et al. | 370/401 |
| 2004/0017130 A1 | 1/2004 | Wang et al. | |

OTHER PUBLICATIONS

Hinton, et al., "SAM:Security Adaption Manager", Dec. 1999, Computer Security Applications Conference, 1999. (ACSAC '99) Proceedings, pp. 361-370.*

(Continued)

*Primary Examiner*—Kambiz Zand
*Assistant Examiner*—William S Powers
(74) *Attorney, Agent, or Firm*—Robert A. Greenberg

(57) ABSTRACT

Methods and apparatus for loading a security algorithm in a fast path of a network processor are disclosed. In an example method, a network processor generates a statistic associated with a plurality of communication packets received by the network processor, determines a security attack on the network processor is in progress based on the statistic and loads the security algorithm in the fast path of the network processor.

50 Claims, 4 Drawing Sheets

OTHER PUBLICATIONS

United States Patent and Trademark Office, Non-Final Office action issued Jul. 5, 2006, in connection with U.S. Pat. Appln. No. 10/315,802, 13 pages.

United States Patent and Trademark Office, Final Office action issued Dec. 21, 2006, in connection with U.S. Appln. No. 10/315,802, 19 pages.

United States Patent and Trademark Office, Advisory Action Before the Filing of an Appeal Brief issued Feb. 26, 2007, in connection with U.S. Appl. No. 10/315,802, 3 pages.

United States Patent and Trademark Office, Notice of Panel Decision from Pre-Appeal Brief Review issued Jul. 18, 2007, in connection with U.S. Appln. No. 10/315,802, 2 pages.

United States Patent and Trademark Office, Non-Final Office action issued Sep. 4, 2007, in connection with U.S. Appln. No. 10/315,802, 21 pages.

United States Patent and Trademark Office, Non-Final Office action issued Apr. 4, 2008, in connection with U.S. Appln. No. 10/315,802, 19 pages.

Intel, "Intel IXP1200 Network Processor Family", Hardware Reference Manual, Dec. 2001, pp. 1-124.

Johnson, Erik et al., "Intel IXP1200 Programming—The Microengine Coding Guide for the Intel Network Processor Family", Intel Press, 2002, pp. 1-337.

Intel, "IXP1200 Network Processor", Software Reference Manual, Sep. 2000, 131 pages.

* cited by examiner

DYNAMIC NETWORK SECURITY APPARATUS AND METHODS OR NETWORK PROCESSORS

FIELD OF THE DISCLOSURE

The present disclosure relates generally to processors and, more particularly, to apparatus and methods that dynamically load a security algorithm in a network processor based on network conditions.

BACKGROUND

Increased usage of communication networks, particularly packet-switched networks such as the Internet, has increased the need for more effective network security. Thus, as the amount of potentially valuable information conveyed via communication networks increases, the incentive for unauthorized persons to expose this information increases.

There are many well-known techniques for compromising the security of a packet-switched communication network or network communication device such as, for example, a network processor, an application specific integrated circuit (ASIC), etc. One well-known technique is commonly referred to as a denial of service (DOS) attack. A DOS attack can be implemented and launched in a number of different manners. For example, Internet protocol (IP) source address spoofing, SYN packet flooding, UDP flooding, ICMP echo reply, ICMP flooding and sequence number attacks are several well-known types of DOS attacks. Each of these known DOS attacks can be detected, uniquely identified and overcome to prevent a compromise of network security, as long as the device or devices detecting, identifying and responding to the attack are capable of quickly executing an appropriate response algorithm.

Typically, a network, which may include a plurality of coupled general purpose processors, network processors and/or ASICs uses one or more of these devices to carry out responses or countermeasures to network security attacks. For example, the responses or countermeasures may include executing algorithms that detect, identify and respond to particular types of DOS attacks. ASICs are highly customized devices that typically perform a single predetermined algorithm and, thus, can be used to rapidly and effectively respond to a DOS attack or some other type of network security attack. Unfortunately, ASICs are static in nature and are typically only capable of executing a relatively limited number predetermined security countermeasure algorithms that are encoded within the ASICs at the time of their manufacture or configuration. As a result, if an ASIC is subjected to a DOS attack or any other type of network security attack for which the ASIC does not have a responsive algorithm, the ASIC will be unable to effectively respond to the attack to prevent a compromise of network security.

In contrast to ASICs, network processors are programmable and, as a result, the security algorithm executed by a network processor can be modified prior to run-time (i.e., the time during which the network processor is executing software) by downloading appropriate software into the network processor prior to run-time. Traditionally, development of an effective response to a network security attack has required programmers to develop network security software that is specifically adapted to be loaded and executed within the fast path packet processing portion (i.e., the fast path hardware) of the network processor. Unfortunately, the software instruction set available for execution within the fast path hardware of network processors is typically relatively limited. Additionally, the fast path processing portion of a network processor typically provides relatively limited memory space (i.e., a code store) for instructions. As a result, the complexity and size of programs that can be loaded and executed within the fast path hardware of a network processor is somewhat limited. Consequently, programmers typically select a single network security algorithm for downloading and execution within the fast path of a network processor. Thus, the security measure or the algorithm responsive to a network security attack used within a network processor is static (i.e., cannot be changed during run-time) and typically cannot respond to more than one type of network security attack.

Furthermore, while an operating system can be used to selectively manage the execution of multiple applications or processes, known network processors do not employ conventional operating systems because a conventional operating system would compromise the speed at which the network processor could execute its security algorithms. Thus, in practice, network processors are also static in nature (i.e., they are typically programmed to respond to a single type of network security threat) and the security algorithm executed by a network processor typically cannot be changed during run-time.

DESCRIPTION OF THE PREFERRED EXAMPLES

Figure 1:
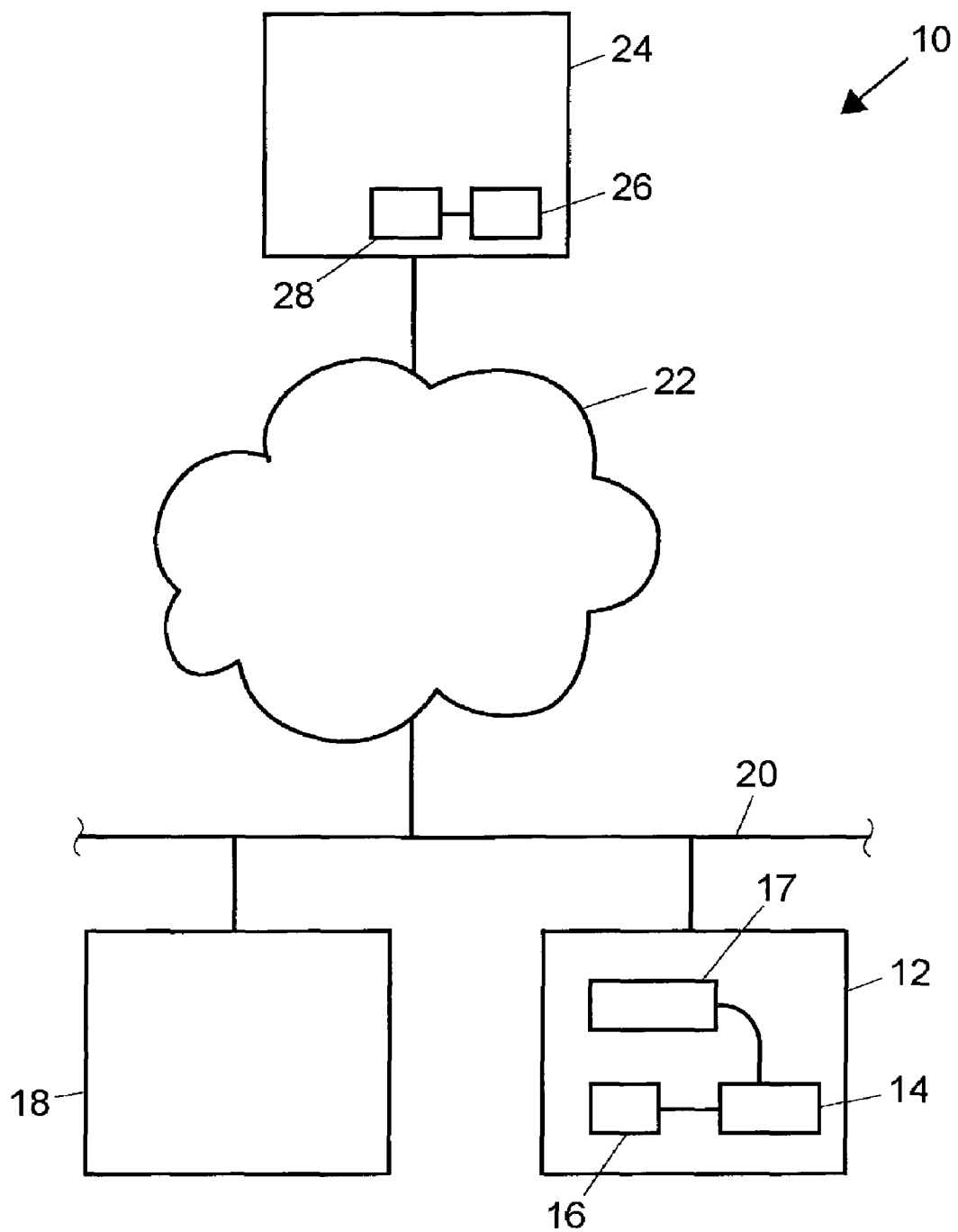
FIG. 1 is a diagrammatic view of an example system in which the dynamic network security methods and apparatus described herein may be used.

FIG. 1 is a diagrammatic view of an example system 10 in which the dynamic network security methods and apparatus described herein may be used. As shown in FIG. 1, the system 10 includes a computer system or workstation 12 having a network processor 14 and an optional co-processing unit 16. The network processor 14 may be any suitable network processor including, for example, Intel IXP425, IXP1200 and IXP2x00 processors. As is conventional, the network processor 14 includes multiple sub-processing units or processors (not shown), one of which is adapted to perform rapid or fast path processing of communication packets and another of which is adapted to perform general processing activities, which may include packet processing and other processing activities. If included, the co-processing unit 16 can be used by the network processor 14 to perform certain operations (e.g., arithmetic operations) to enable the network processor 14 to more efficiently perform its communication functions.

The workstation 12 also includes a memory 17 that is coupled to the network processor 14. As described in greater detail below, the memory 17 includes a database of security algorithms, one or more of which may be selectively instantiated and executed by the network processor 14 based on network conditions such as, for example, the characteristics of the communications received via a local area network 20 and a packet-switched network 22 to which the network processor 14 is coupled.

In addition, the workstation 12 is coupled to another computer system 18 via the local area network 20. The computer system 18 may be a workstation similar or identical to the workstation 12, or may be any other type of computer system. The local area network 20 can be implemented using Ethernet, which is a well-known networking configuration, or any other suitable networking configuration. The workstation 12 is also coupled via the local area network 20 to the packet-switched network 22 (e.g., the Internet) which, in turn, is coupled to a remotely situated workstation 24 having a network processor 26 and co-processing unit 28 therein. Additional computers or workstations may be coupled to the local area network 20 or the packet-switched network 22, if desired.

Figure 2:
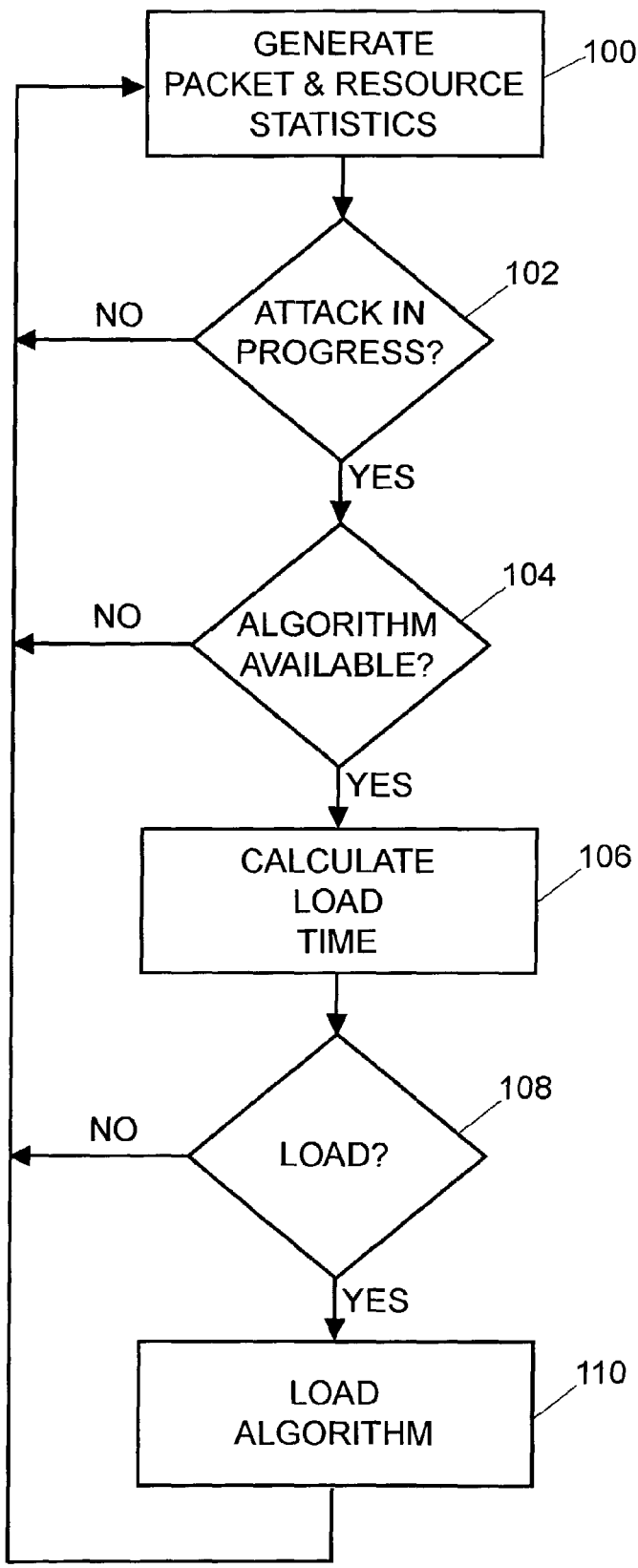
FIG. 2 is flow diagram of an example manner in which dynamic network security may be implemented within the system shown in FIG. 1.

FIG. 2 is flow diagram of an example manner in which dynamic network security may be implemented within the workstation 12 shown in FIG. 1. Preferably, the method depicted in FIG. 2 is executed using the general processing facilities of the network processor 14 shown in FIG. 1 and, thus, is not executed within the fast path communication packet processing facilities of the network processor 14. However, some or all of the method shown and described in connection with FIG. 2 could instead be executed within a general purpose processor (not shown) within the workstation 12 or any other suitable processing unit coupled to the network processor 14.

Additionally, the method depicted in FIG. 2 is performed in parallel to normal communication packet processing activities and, thus, does not affect the speed at which the normal communication packet processing activities occur. As noted above, a network processor, such as the network processor 14 shown in FIG. 1, includes multiple processing units (not shown), some of which are general purpose in nature and at least one of which is configured to function as a fast path packet processing unit. While the various processing units within a network processor can communicate with each other, these processing units can operate independently (i.e., in parallel).

As depicted in FIG. 2, incoming communication packets, which in this example are IP packets, are monitored and statistical information and other characteristics related to those packets are generated (block 100). Additionally, statistical information and other characteristics related to resources associated with the network processor 14 such as, for example, a connection buffer condition, are generated (block 100). Some or all of the calculations required to generate the statistical information may be performed by the co-processing unit 16.

The particular types of statistics generated (block 100) are selected to enable detection of one or more possible types of network security attacks. For example, with a type of DOS attack commonly known as IP source address spoofing, the source address is randomly changed to addresses that are not generally present in the Internet routing tables and are therefore unreachable. Each unreachable address consumes a connection and buffer space within the network processor receiving the connection requests for a substantial amount of time. Thus, an IP source address spoofing attack can be detected by monitoring the number of available connections and the number of buffers corresponding to each connection and comparing currently used resources to typical resource usage. When a network processor is subjected to an IP address spoofing attack, the current resource usage for the network processor greatly exceeds its typical resource usage by, for example, as much as 80%. Thus, to enable detection of an IP address spoofing attack, the statistics generated at block 100 preferably include values associated with the use rate of the connection buffer within the network processor 14.

On the other hand, with a type of DOS attack commonly known as SYN packet flooding, an attacking system uses the three-way handshake that establishes a TCP connection to consume available connections within the host system (i.e., the system under attack). In particular, the attacking system sends a large number of SYN packets and does not acknowledge (i.e., ACK) the SYN ACK signal received from the host system. As a result, requested connections cannot be completed and become unavailable for use by legitimate TCP users. Ultimately, the attacking system consumes all available connections within the host system (i.e., within the network processor of the host system) and service is denied to legitimate users. Thus, a SYN packet flooding attack can be detected by generating statistical information related to the rate at which SYN packets are received by a network processor and comparing the current rate at which SYN packets are received to a threshold value such as, for example, 10,000 per second. If the current rate at which SYN packets are received by a network processor exceeds the predetermined threshold, an event may be generated to indicate the possibility that a SYN packet flooding attack is underway. Thus, the generated statistics (block 100) preferably include information associated with the rate at which SYN packets are received by the network processor 14.

Still further, other statistics such as, for example, the rate at which UDP packets and ICMP packets are received by the network processor 14 may be generated (block 100), thereby enabling detection of other types of network security attacks such as UDP flooding, ICMP flooding, ICMP echo reply, or any other type of network security attack. Of course, the packet and resource statistics and other packet and resource information generated (block 100) can include any other desired statistics and information needed to detect any known or unknown type of network security attack.

Packet and resource statistics are used to determine whether a network security attack is in progress (block 102). For example, in the case where the network processor 14 is under an IP address spoofing attack, the network processor 14 will recognize an abnormally elevated use rate for its connection buffer. In the case of a TCP SYN flooding attack, the network processor 14 will recognize an abnormally high rate of incoming SYN packets and/or an abnormally high connection buffer fill rate. In any case, if the network processor 14 determines that there is no network security attack in progress, the network processor 14 returns to generating packet and resource statistics and other information (block 100).

On the other hand, if the network processor 14 determines that a network security attack is in progress, the network processor 14 then determines whether an appropriate security algorithm (i.e., an algorithm that can effectively respond to the current attack) is available (block 104). In particular, the network processor 14 first determines if an appropriate algorithm is currently loaded in its fast path processing hardware. If an appropriate algorithm is not currently loaded in the fast path hardware of the network processor 14, the security algorithm database in the memory 17 is searched for an appropriate security algorithm. If the network processor 14 determines that an appropriate algorithm is not available, the network processor 14 may select an algorithm best-suited to respond to the current attack and load that algorithm as described below or, alternatively, may not load any algorithm and return to generating packet and resource statistics (block 100).

If an appropriate security algorithm is available, the network processor 14 calculates the amount of time required to load that security algorithm in the fast path hardware of the network processor 14 (block 106).

The network processor 14 then determines if the selected algorithm (for which the load time has been calculated) should be loaded into the fast path hardware of the network processor 14 (block 108). The decision whether or not to load the selected algorithm is preferably based on a value function that balances the benefits of rapid adaptation (i.e., changing) of the security algorithm executed by the network processor 14 against the decrease in communications throughput (which is a significant source of user inconvenience) that results from the delays caused by having to pause communications while an algorithm is downloaded into the fast path hardware of the network processor 14. For example, in the case where one or more of the generated packet and resource statistics (block 100) are dithering about one or more respective threshold values associated with security attacks, the network processor 14 may attempt to rapidly or continuously load different security algorithms. Such excessive or frequent loading of security algorithms can substantially reduce the amount of time the network processor 14 spends processing communication packets, resulting in a substantial reduction in communications throughput.

To prevent excessive or frequent downloading of security algorithms, the network processor 14 may use a value function that is based on a ratio of the download time for an algorithm to be loaded into its fast path hardware and the elapsed time since a download to the fast path hardware last occurred. Thus, as the download time for an algorithm approaches a significant portion of the time elapsed since a last download, the desirability or value of downloading a newly selected algorithm decreases. For example, the network processor 14 may not download a different algorithm into its fast path hardware if the time required to download a selected algorithm is more than one percent of the time elapsed since the last download. Of course, a value greater than or less than one percent of the time elapsed since the last download can be used instead.

If the network processor 14 determines, based on the value function, that an algorithm should not be loaded, the network processor 14 returns to generating packet and resource statistics (block 100). On the other hand, if the network processor 14 determines that an algorithm should be loaded, the network processor 14 loads the algorithm into its fast path (block 110) using any desired utility for updating the control store of the network processor 14. Such utilities are well known and, thus, are not described in greater detail herein.

The database of security algorithms stored within the memory 17 may be created using software development tools that are well known by network processor software developers. For example, an algorithm responsive to a SYN flooding attack may increase the size of the connection queue or buffer within the network processor 14 by, for example, twenty-five percent and may decrease the timeout waiting period for a three-way handshake by, for example, forty percent.

Figure 3:
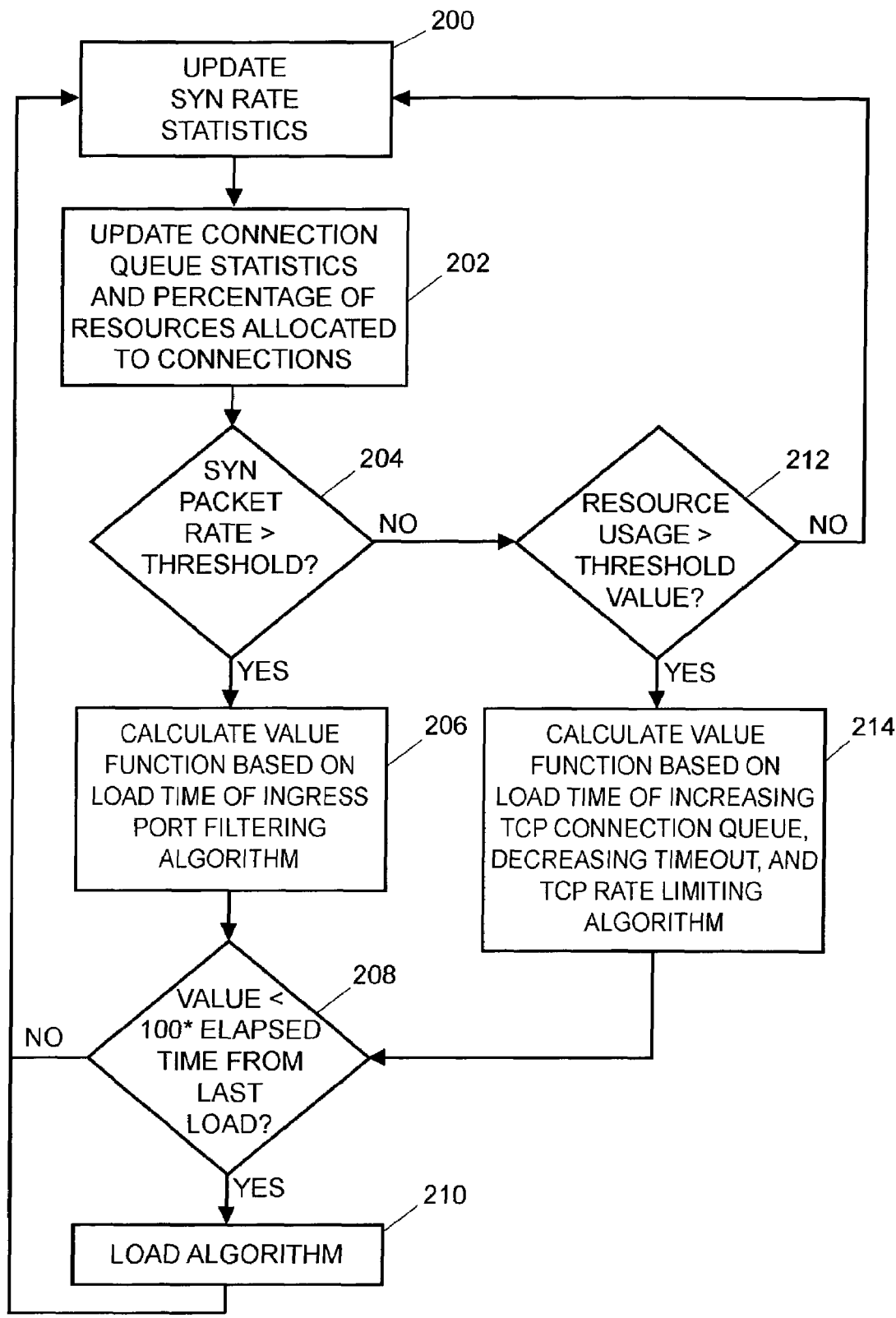
FIG. 3 is a flow diagram of an example manner in which the dynamic network security technique shown in FIG. 3 may be used to detect and respond to a TCP SYN attack.

FIG. 3 is a flow diagram of an example manner in which the dynamic network security technique shown in FIG. 2 may be used to detect and respond to a TCP SYN attack. As shown in FIG. 3, the network processor 14 updates the SYN rate statistic after receiving each packet (block 200). The network processor 14 also updates connection queue statistics (e.g., the connection queue fill rate) and calculates the percentage of resources allocated to each connection (block 202). Of course, the network processor 14 may use the co-processing unit 16 to perform one or more calculations needed to generate the information, statistics, etc. associated with blocks 200 and 202.

After updating communication packet and resource statistics and other information (blocks 200 and 202), the network processor 14 compares the SYN packet rate statistic to a predetermined threshold value associated with a TCP SYN attack (block 204). If the SYN packet rate statistic is greater than the threshold value associated with a TCP SYN attack, the network processor 14 determines that a TCP SYN attack is in progress. If a TCP SYN attack is in progress, the network processor 14 calculates a value function that is preferably based on a load time of an ingress port filtering algorithm (block 206). Ingress port filtering algorithms are one well-known technique for responding to a TCP SYN attack and, thus, are not described in greater detail herein.

The network processor 14 then determines if the result of the value function (e.g., a load time) is less than one hundred times the time elapsed since a security algorithm was downloaded to the fast path hardware of the network processor 14 (block 208). If the result of the value function is greater than or equal to one hundred times the elapsed time since a security algorithm was downloaded into the fast path hardware of the network processor 14, the network processor 14 returns to updating the SYN rate statistic (block 200) in response to the receipt of communication packets. On the other hand, if the network processor 14 determines that the result of the value function is less than one hundred times the time elapsed since an algorithm was downloaded into the fast path hardware of the network processor 14, the network processor 14 loads the selected algorithm, which in this case is an ingress port filtering algorithm, into the fast path of the network processor 14 (block 210).

If the network processor 14 determines that the SYN packet rate is less than the predetermined threshold value (block 204), the network processor 14 then determines whether the resource usage (e.g., based on connection queue statistics, percentage of resources allocated to connections, etc.) is greater than a predetermined threshold value associated with a TCP SYN attack (block 212). If the network processor 14 determines that resource usage is less than or equal to the threshold value (block 212), the network processor 14 assumes that a TCP SYN attack is not in progress and returns to updating the SYN rate statistic in response to receipt of communication packets (block 200). On the other hand, if the network processor 14 determines that resource usage is greater than the threshold value (block 212), the network processor assumes that a TCP SYN attack is in progress and calculates a value function based on the load time of an appropriate algorithm such as, for example, an algorithm that increases the size of the connection queue and/or decreases the timeout waiting period for three-way handshakes.

After the value function is calculated (e.g., the algorithm load time is calculated), the result of the value function, which in this example is a load time, is compared to one hundred times the elapsed time since an algorithm was last loaded into the fast path of the network processor 14 (block 208). If the network processor 14 determines that the result of the value function is less than one hundred times the elapsed time since an algorithm was last loaded into the fast path hardware of the network processor 14, the network processor loads an algorithm that increases the size of the connection queue and/or decreases the timeout waiting period for three-way handshakes (block 210). Otherwise, if the result of the value function calculated at block 214 is greater than or equal to one hundred times the elapsed time since an algorithm was last loaded into the fast path hardware of the network processor 14, the network processor 14 returns to updating the SYN rate statistic (block 200).

The technique described in connection with FIGS. 2 and 3 can also be used to enable dynamic downloading (i.e., downloading during run-time) of network security algorithms to a network processor that is functioning within a virtual private network (VPN) gateway. For example, the system 10 shown in FIG. 1 may employ a VPN that enables secure communications between the workstation 24 and one or both of the workstations 18 and 12 via the internet 22. In that case, the network processor 14 may function as a gateway to the VPN, thereby enabling applications or clients within the workstation 18 and/or the workstation 12 to communicate in a secure manner via the internet 22 with one or more applications within the workstation 24.

Figure 4:
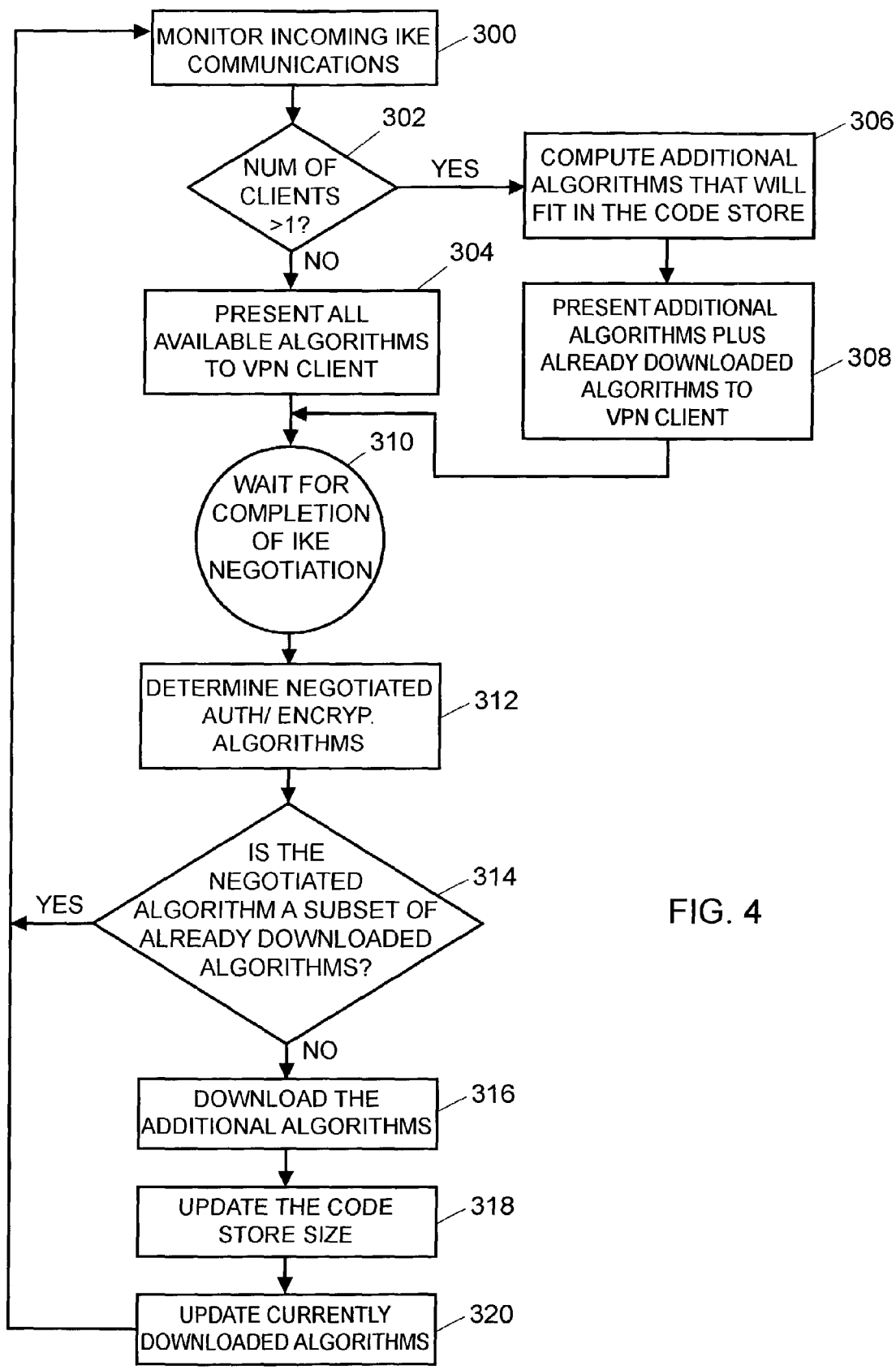
FIG. 4 is a flow diagram of another example manner in which dynamic network security may be implemented within a network processor coupled to a virtual private network.

FIG. 4 is a flow diagram of an example manner in which dynamic network security may be implemented within a network processor, such as the network processor 14 shown in FIG. 1, coupled to a VPN. The example technique described in connection with FIG. 4 is based on the Internet Protocol Security (IPsec) standard, which is a standard that defines communication security algorithms for use within the packet processing layer, and uses the Internet key exchange (IKE) protocol, which is a well-known security key negotiation protocol. However, other standards and protocols could be used instead.

As shown in FIG. 4, the network processor 14 monitors incoming IKE packets or communications received from one or more clients within the system 10. When a client, such as for example an application executed within the workstation 18, attempts to establish communications with an application executed within the workstation 24 via the internet 22, the client initiates a negotiation with the gateway, which in this example is implemented with the network processor 14. The negotiation includes IKE packets that include an IKE query, which is interpreted by the network processor 14 as a request to inform the client about what security algorithms are available for use in establishing communications between the network processor 14 and the client.

Upon recognizing that an IKE query is in progress (block 300), the network processor 14 determines whether more than one client is already connected to the network processor 14 (block 302) (i.e., to the VPN being managed by the network processor 14). For purposes of the example in FIG. 4, a client that is currently negotiating for a connection is considered a connected client. If only one client is connected to the VPN, the network processor 14 presents all available security algorithms to the VPN client currently negotiating for a connection. The security algorithms are preferably stored within a database within the memory 17. Also, preferably, the security algorithms include any desired authentication and encryption algorithms that are configured for execution within the fast path hardware of the network processor 14.

On the other hand, if the network processor 14 determines that more than one client is connected to the VPN, the network processor 14 determines which of the security algorithms within the database of the memory 17 that have not already been downloaded to the network processor 14 will fit within the code store of the fast path hardware of the network processor 14 (block 306). The network processor 14 then presents to the client requesting a connection the additional algorithms that can be downloaded into the code store of the network processor 14 (as determined at block 306) along with the algorithms that have already been downloaded into the code store of the network processor 14, if any (block 308).

After the network processor 14 has presented available algorithms (either block 304 or block 308) to the client requesting a connection, the network processor 14 waits for IKE negotiations to complete (block 310). At the completion of the negotiations, the client requesting a connection has selected one or more of the algorithms presented at either block 304 or block 308.

The network processor 14 then determines which of the presented algorithms have been selected or negotiated (block 312) and determines whether the selected or negotiated algorithms have already been downloaded into the code store of the fast path of the network processor 14 (block 314). If the selected or negotiated algorithms have already been downloaded, the network processor 14 returns to monitoring incoming IKE communications (block 300). On the other hand, if the network processor 14 determines that the selected or negotiated algorithms have not already been downloaded, the network processor 14 downloads the selected algorithms into its fast path hardware (block 316).

After the network processor 14 has downloaded the selected algorithms (block 316), the network processor 14 updates a value indicative of the size of the remaining code store within the fast path of the network processor 14 (block 318). The network processor 14 also updates a list or other data structure that contains information relating to the algorithms that have already been downloaded and that are currently stored within the fast path hardware of the network processor 14 (block 320).

Thus, the technique described in connection with FIG. 4 above enables a network processor that is functioning as a gateway within a VPN to dynamically load (i.e., load during run-time) and execute one or more network security algorithms for execution within its fast path hardware. Thus, as clients connect to the VPN gateway, the number of different security algorithms downloaded and executed by the network processor within the gateway can increase. Likewise, as clients disconnect from the VPN, the number of algorithms downloaded into the fast path of the network processor may decrease and algorithms eliminated from the code store within the fast path of the network processor can be reclaimed for later use. Of course, if a plurality of clients are connected to the VPN via the gateway, some or all of the connected clients could use the same algorithm, each of the clients may use a different algorithm (assuming there is sufficient room in the code store of the fast path of the network processor), or groups of two or more clients may use different algorithms.

Still further, the technique described in FIG. 4, if only one client is connected to the VPN, the client can initiate, using IKE communications, a negotiation with the VPN gateway for the download of a security algorithm different from the one currently downloaded. For example, the client can request a security algorithm that provides stricter authentication and/or encryption mechanisms.

Although certain methods and apparatus implemented in accordance with the teachings of the invention have been described herein, the scope of coverage of this patent is not limited thereto. To the contrary, this patent covers all embodiments of the teachings of the invention fairly falling within the scope of the appended claims either literally or under the doctrine of equivalents.

What is claimed is:

1. A method comprising:
generating a statistic associated with a plurality of communication packets received by a processor;
determining a security attack on the processor is in progress based at least in part on the statistic;

determining whether to load a security algorithm based on an amount of download time to download the security algorithm; and loading the security algorithm in a fast path of the processor based on the determining whether to load the security algorithm.

2. The method of claim 1, further including calculating a function that balances adaptation time and communication throughput and comparing a result of the function to a threshold value prior to loading the security algorithm in the fast path of the processor.

3. The method of claim 1, wherein loading the security algorithm in the fast path of the processor includes loading the security algorithm in the fast path of the processor based on a comparison of a value function result and a threshold value.

4. The method of claim 1, wherein loading the security algorithm in the fast path of the processor comprises loading the security algorithm in response to determining that the amount of download time to download the security algorithm is acceptable relative to a second amount of time indicative of an elapsed duration since a previous download of the security algorithm.

5. The method of claim 1, further including determining the security algorithm is available for downloading from a database associated with the processor.

6. The method of claim 1, wherein generating the statistic associated with the plurality of communication packets received by the processor includes generating one or more of a SYN rate statistic, a connection queue statistic, or a resource allocation statistic.

7. The method of claim 1, wherein determining the security attack on the processor is in progress based at least in part on the statistic includes comparing the statistic to a threshold value associated with the security attack.

8. The method of claim 7, wherein comparing the statistic to the threshold value associated with the security attack includes comparing the statistic to a value associated with one or more of a TCP SYN attack, an IP source address spoofing attack, a UDP flooding attack, an ICMP echo reply attack, an ICMP flooding attack, or a sequence number attack.

9. A system comprising:
a memory containing a plurality of security algorithms; and
a processor coupled to the memory and programmed to:
generate a statistic associated with a plurality of communication packets received by the processor;
determine a security attack on the processor is in progress based at least in part on the statistic;
determine whether to load a security algorithm based on an amount of download time to download the security algorithm; and
load the one of the plurality of security algorithms in the processor based on the determining whether to load the security algorithm.

10. The system of claim 9, wherein the processor is further programmed to calculate a value function result and compare the value function result to a threshold value prior to loading the one of the plurality of security algorithms in the processor.

11. The system of claim 10, wherein the processor is further programmed to load the security algorithm in the processor based at least in part on the comparison of the value function result and the threshold value.

12. The system of claim 9, wherein the processor is programmed to load the one of the plurality of security algorithms in response to determining that the amount of download time to download the security algorithm is acceptable relative to a second amount of time indicative of an elapsed duration since a previous download of the security algorithm.

13. The system of claim 9, wherein the processor generates the statistic associated with the plurality of communication packets received by the processor by generating one or more of a SYN rate statistic, a connection queue statistic, or a resource allocation statistic.

14. The system of claim 9, wherein the processor determines the security attack on the processor is in progress based on the statistic by comparing the statistic to a threshold value associated with the security attack.

15. An apparatus comprising:
a machine accessible medium; and
instructions stored on the machine accessible medium and adapted to be executed by a processor to:
generate a statistic associated with a plurality of communication packets received by the processor;
determine a security attack on the processor is in progress based on the statistic;
determine whether to load a security algorithm based on an amount of download time to download the security algorithm; and
load the one of the plurality of security algorithms in the processor based on the determining whether to load the security algorithm.

16. The system of claim 15, wherein the instructions are adapted to be executed by the processor to calculate a value function result and compare the value function result to a threshold value prior to loading the one of the plurality of security algorithms in the processor.

17. The system of claim 16, wherein the instructions are adapted to load the one of the plurality of security algorithms in the processor based at least in part on the comparison of the value function result and the threshold value.

18. The system of claim 15, wherein the instructions are adapted to be executed by the processor to load the one of the plurality of security algorithms in response to determining that the amount of download time to download the security algorithm is acceptable relative to a second amount of time indicative of an elapsed duration since a previous download of the security algorithm.

19. The system of claim 15, wherein the instructions are adapted to be executed by the processor to generate the statistic associated with the plurality of communication packets received by the processor by generating one or more of a SYN rate statistic, a connection queue statistic, or a resource allocation statistic.

20. The system of claim 15, wherein the instructions are adapted to be executed by the processor to determine the security attack on the processor is in progress based at least in part on the statistic by comparing the statistic to a threshold value associated with the security attack.

21. A machine accessible medium having associated data that, when accessed, causes a machine to:
generate a statistic associated with a plurality of communication packets received by the processor;
determine a security attack on the processor is in progress based on the statistic;
determine whether to load a security algorithm based on an amount of download time to download the security algorithm; and
load the one of the plurality of security algorithms in the processor based on the determining whether to load the security algorithm.

22. The machine accessible medium of claim 21, wherein the data, when accessed, causes the machine to calculate a value function result and compare the value function result to a threshold value prior to loading the one of the plurality of security algorithms in the processor.

23. The machine accessible medium of claim 22, wherein the data, when accessed, causes the machine to load the one of the plurality of security algorithms in the processor based at least in part on the comparison of the value function result and the threshold value.

24. The machine accessible medium of claim 22, wherein the data, when accessed, causes the machine to compare the value function result to the threshold value by comparing a load time of the one of the plurality of security algorithms to an elapsed time from a previous download to the processor.

25. The machine accessible medium of claim 21, wherein the data, when accessed, causes the machine to generate the statistic associated with the plurality of communication packets received by the processor by generating one or more of a SYN rate statistic, a connection queue statistic, or a resource allocation statistic.

26. The machine accessible medium of claim 21, wherein the data, when accessed, causes the machine to determine the security attack on the processor is in progress based at least in part on the statistic by comparing the statistic to a threshold value associated with the security attack.

27. A method comprising:
receiving a request for a connection to a processor from a first network client;
determining whether a second network client is already connected to the processor;
presenting a first plurality of available security algorithms to the first network client when the second network client is not already connected to the processor and a second plurality of available security algorithms to the first network client when the second network client is already connected to the processor, wherein at least some of the second plurality of available security algorithms are different from the first plurality of available security algorithms;
selecting a security algorithm from one of the first or second plurality of available security algorithms to be used for communications with the first network client; and
downloading the selected security algorithm to be used for communications with the first network client to the processor.

28. The method of claim 27, further including presenting the second plurality of available security algorithms so that at least one previously downloaded security algorithm and one security algorithm that has not been downloaded from the first or second plurality of available security algorithms are presented to the first network client.

29. The method of claim 28, wherein receiving the request for the connection to the processor from the first network client includes receiving a request for a virtual private network connection from the first network client.

30. The method of claim 29, wherein receiving the request for the virtual private network connection from the first network client includes receiving security key exchange information from the first network client.

31. The method of claim 27, wherein presenting the first or second plurality of available security algorithms to the first network client includes presenting authentication and encryption algorithms to the first network client.

32. The method of claim 27, wherein downloading the selected security algorithm to be used for communications with the first network client to the processor includes loading the selected security algorithm in the fast path of the processor.

33. A network communication device, comprising:
a memory containing a plurality of security algorithms; and
a processor coupled to the memory and programmed to:
receive a request for a connection to the processor from a first network client;
determine whether a second network client is already connected to the processor;
present a first set of the plurality of security algorithms to the first network client when the second network client is not already connected to the processor and a second set of the plurality of security algorithms to the first network client when the second network client is already connected to the processor, wherein at least some security algorithms in the second set of the plurality of security algorithms are different from security algorithms in the first set of the plurality of security algorithms;
select a security algorithm from one of the first or second sets of the plurality of security algorithms to be used for communications with the first network client; and
download the selected security algorithm to be used for communications with the first network client to the processor.

34. The network communication device of claim 33, wherein the processor is programmed to present the second set of the security algorithms so that at least one previously downloaded security algorithm and one security algorithm that has not been downloaded from the first or second set of the security algorithms are presented to the first network client.

35. The network communication device of claim 33, wherein the processor functions as a gateway to a virtual private network.

36. The network communication device of claim 33, wherein the processor is programmed to use security key exchange information received from the first network client to generate the first and second sets of the security algorithms.

37. The network communication device of claim 33, wherein the plurality of security algorithms include authentication and encryption algorithms.

38. An apparatus comprising:
a machine accessible medium; and
instructions stored on the machine accessible medium and adapted to be executed by a processor to:
receive a request for a connection to the processor from a first network client;
determine whether a second network client is already connected to the processor;
present a first plurality of available security algorithms to the first network client when a second network client is not already connected to the processor and a second plurality of available security algorithms to the first network client when the second network client is already connected to the processor, wherein at least some of the second plurality of available security algorithms are different from the first plurality of available security algorithms;
select a security algorithm from one of the first or second plurality of available security algorithms to be used for communications with the first network client; and
download the selected security algorithm to be used for communications with the first network client to the processor.

39. The apparatus of claim 38, wherein the instructions are adapted to be executed by the processor to present the second plurality of available security algorithms to the first network client so that at least one previously downloaded security algorithm and one security algorithm that has not been downloaded from the first or second plurality of available security algorithms are presented to the first network client.

40. The apparatus of claim 38, wherein the instructions are adapted to be executed by the processor to download the selected security algorithm to be used for communications with the first network client to the processor by loading the selected security algorithm in the fast path of the processor.

41. A machine accessible medium having associated data that, when accessed, causes a machine to:
receive a request for a connection to the processor from a first network client;
determine whether a second network client is already connected to the processor;
present a first plurality of available security algorithms to the first network client when the second network client is not already connected to the processor and a second set of the plurality of security algorithms to the first network client when the second network client is already connected to the processor, wherein at least some security algorithms in the second set of the plurality of security algorithms are different from security algorithms in the first set of the plurality of security algorithms;
select a security algorithm from one of the first or second plurality of available security algorithms to be used for communications with the first network client; and
download the selected security algorithm to be used for communications with the first network client to the processor.

42. The machine accessible medium of claim 41, wherein the data, when accessed, causes the machine to present the second plurality of available security algorithms to the first network client so that at least one previously downloaded security algorithm and one security algorithm that has not been downloaded from the first or second plurality of available security algorithms are presented to the first network client.

43. The machine accessible medium of claim 41, wherein the data, when accessed, causes the machine to download the selected security algorithm to be used for communications with the first network client to the processor by loading the selected security algorithm in the fast path of the processor.

44. A method comprising:
monitoring a characteristic of communications on a network;
detecting a network security attack based at least in part on the monitored characteristic;
determining whether to load a security algorithm based on an amount of download time to download the security algorithm; and
loading the security algorithm in a fast path of a processor based on the determining whether to load the security algorithm.

45. The method of claim 44, wherein monitoring the characteristic of the communications on the network includes generating one or more of a communication packet statistic or a resource statistic.

46. The method of claim 45, wherein detecting the network security attack based at least in part on the monitored characteristic includes comparing the monitored characteristic to a threshold value associated with the network security attack.

47. A computer system, comprising:
a memory containing a plurality of security algorithms; and
a processor coupled to the memory and programmed to:
monitor communications on a network;
load the one of the plurality of security algorithms in the processor based on the monitored communications in response to determining that an amount of download time to download the security algorithm is acceptable relative to a second amount of time indicative of an elapsed duration since a previous download of the security algorithm.

48. The computer system of claim 47, wherein the plurality of security algorithms include one or more of an authentication algorithm, an encryption algorithm, or an algorithm responsive to a network security attack.

49. The computer system of claim 47, wherein the processor is programmed to generate a statistic based on the monitored communications and to load the one of the plurality of security algorithms in the processor based on the monitored communications by comparing the statistic to a value associated with a network security attack.

50. The computer system of claim 47, wherein the processor is further programmed to calculate a value function result associated with loading the one of the plurality of algorithms in the processor and to load the one of the plurality of security algorithms in the processor based at least in part on the value function result.

* * * * *